Jan. 24, 1933. H. S. ALEXANDER ET AL 1,895,274
BIAS CUTTING MACHINE
Filed Oct. 10, 1928 2 Sheets-Sheet 2
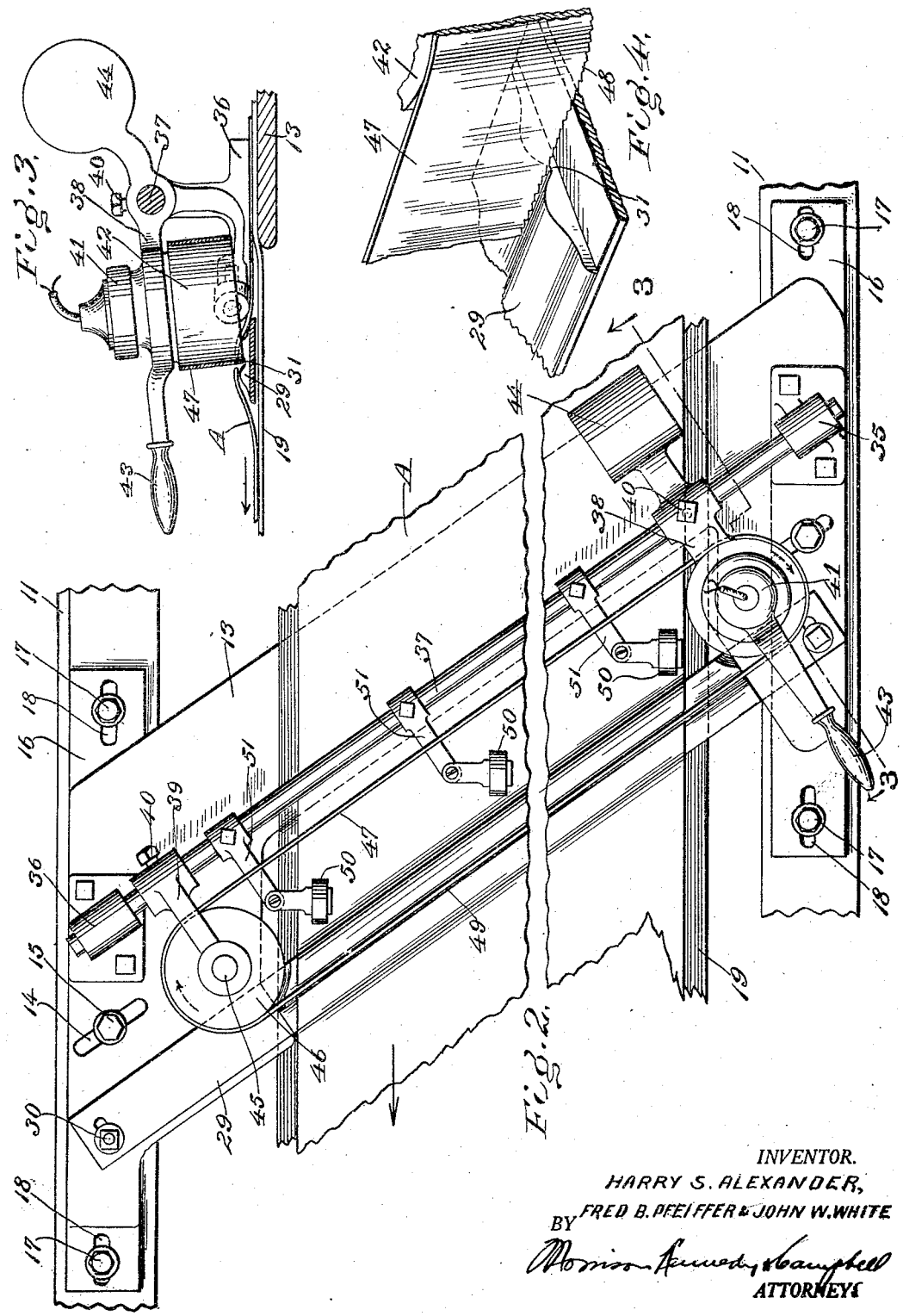
INVENTOR.
HARRY S. ALEXANDER,
BY FRED B. PFEIFFER & JOHN W. WHITE
ATTORNEYS Patented Jan. 24, 1933

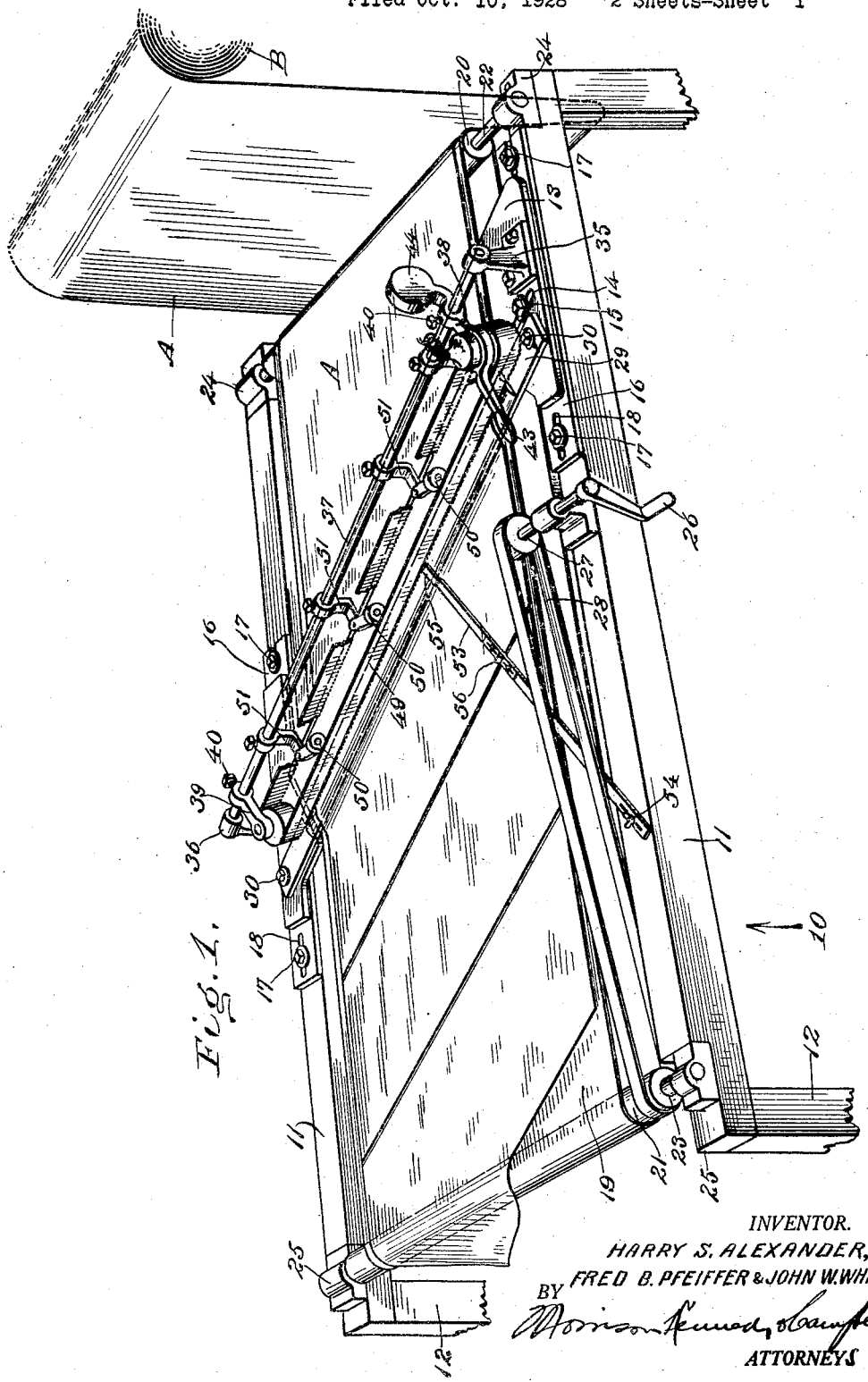

1,895,274

UNITED STATES PATENT OFFICE

HARRY S. ALEXANDER AND FRED B. PFEIFFER, OF AKRON, AND JOHN W. WHITE, OF BARBERTON, OHIO, ASSIGNORS TO SEIBERLING RUBBER COMPANY, A CORPORATION OF DELAWARE

BIAS CUTTING MACHINE

Application filed October 10, 1928. Serial No. 311,433.

This invention relates to improvements in machines for cutting sheet materials, and refers particularly to machines for cutting fabric materials on the bias.

In the manufacture of pneumatic tire casings, there is employed sheet rubber with reinforcing or load-bearing cords embedded therein, this material being arranged in different layers or plies and built to tire shape in green or unvulcanized condition upon a collapsible core or drum. Generally, the cords are arranged in two or more plies or layers and extend diagonally from bead to bead in opposite directions so as to cross each other in the adjacent plies, the number of plies depending upon the size of the casing, or upon the gauge of the cords, or both. In some cases, the cords in each ply or layer are cross-woven or made up in the form of a sheet of fabric or canvas for the production of "fabric tires", and in other cases the cords in each ply or layer are disposed merely side by side in parallel relation with no connection between them except the rubber with which they are impregnated or encased, for the production of "cord tires". In using the word "fabric" in the specification and claims, it is intended to comprehend either kind of sheet material above referred to or any other kind of sheet material embodying cords in one way or another to reinforce the rubber body portion.

The rubberized fabric above described is prepared in sheet form and wound, with a liner, in a stock roll and is later run thru a bias cutting machine which, as its name implies, cuts the sheet diagonally into strips with the cords disposed at the desired angle to the edges defined by the successive cuts. Prior to this invention, the bias cutting machines more generally in use have included jaws which automatically pick up the leading end of the fabric sheet and pull it a definite distance past an angularly disposed knife, by which the bias strip is cut as the jaws reach the limit of their motion. This feeding and cutting action is carried on intermittently at a speed of about thirty strips per minute, and the cut strips are individually placed between cotton cloth leaves of a book in which they are stored until used by the tire builder, or else they are spliced together end to end and wound up with a liner. These machines are very expensive and must be operated almost continuously to be at all economical. Moreover, they require from four to six attendants to operate them, with a consequent labor loss in all cases of delay due to mechanical break downs, bad stock, changing rolls, and other causes. In addition, the machines do not cut the bias strips with the desired accuracy, resulting in considerable waste of material, as well as imperfect construction of the tire in which the material is used.

The foregoing and other objectionable features of the prior art are overcome by the present invention, which has among its objects, the provision of a bias cutting machine of extremely simple construction, which will be economical, accurate, and efficient in use, and capable of being easily adjusted to vary the angle of the bias cut.

More specifically, the invention contemplates a bias cutting machine having a horizontally disposed endless belt conveyor which is manually operated to advance the fabric sheet material step-by-step, and without tension, from a stock supply roll to a cutting position where it is cut diagonally by a power-driven cutter. This cutter is in the nature of an endless band, having a serrated cutting edge, and runs over two spaced pulleys disposed above the conveyor belt adjacent the opposite side edges thereof. The pulleys rotate in a plane at an angle to that in which the fabric is fed to the cutting position so that only one stretch of the endless band cutter comes in contact with the fabric, and pivotal supporting means for the said pulleys provides for selective movement of the cutter to active or inactive positions. The pulleys and their supporting means are adjustable as a unit to vary the angle of the bias cut, and mounted for adjustment with these parts is a rigid bar or plate which is adapted to underlie the fabric and form a support for the same at the cutting line. Suitable presser members are also provided to engage the upper surface of the fabric adjacent to the cutting line for the purpose of holding the fabric against lateral displacement during the cutting operation. The endless band cutter is or may be continuously driven, preferably by an electric motor, while the endless belt conveyor is preferably operable intermittently and by hand to advance the fabric after each cutting operation.

The foregoing and other objects, features and advantages of the invention will be readily understood from the following description in connection with the accompanying drawings, wherein the invention has been shown by way of illustration, and wherein, Fig. 1 is a perspective view of an improved bias cutting machine embodying the invention;

Fig. 2 is a fragmentary top plan view thereof;

Fig. 3 is a vertical transverse sectional view on line 3—3 of Fig. 2; and

Fig. 4 is a fragmentary perspective view of the cutter and fabric supporting bar on a larger scale.

Referring in detail to the drawings, the improved bias cutting machine comprises a fixed main frame 10, having spaced parallel side rails 11 and supporting standards or legs 12, and a supplementary frame 13 which extends transversely of the main frame 10 and is adjustable angularly with reference thereto. The supplementary frame 13 is in the nature of a substantially flat plate which extends obliquely from one side rail 11 to the other, and it is provided adjacent its opposite ends with longitudinal slots 14 for the accommodation of bolts 15 whereby the said frame 13 may be adjustably secured to bedplates 16 on the respective side rails 11. These bed-plates 16 are adjustably secured to the side rails 11 by bolts 17 which extend thru slots 18, and in view of the angular relationship existing between the slots 14 and the slots 18, it is evident that the supplementary frame 13 can be shifted to different angular positions with respect to the main frame 10.

An endless belt conveyor 19 is supported by the main frame 10 to travel in a direction parallel with the side rails 11, the belt running over pulleys 20 and 21 on shafts 22 and 23 respectively, and these shafts are journaled at 24 and 25 adjacent the ends of the main frame side rails. The conveyor 19 is manually operated by a crank 26 which turns a pulley 27 connected by a belt 28 to the conveyor pulley 21. By intermittently turning the crank 26, the rubberized fabric sheet A is fed forwardly step-by-step from a stock supply roll B to a cutting position adjacent the supplementary frame 13, the latter being disposed between the upper and lower stretches of the conveyor belt.

The fabric sheet material to be cut lies upon the belt conveyor 19 and is fed without tension, and as it reaches the cutting position, it is caused to pass over a rigid separator bar 29 whereby it is supported during the cutting operation. This separator bar extends parallel to the plate or frame 13 in a plane immediately above the upper stretch of the conveyor belt 19, and is secured at its opposite ends to said frame by bolts or other suitable fastening elements 30. As best shown in Figs. 3 and 4, the separator bar is formed with a central longitudinal groove 31, at the opposite sides of which the surface of the bar is curved and tapered in such a manner as to allow the fabric to slide over it freely as it is fed by the conveyor.

Rising from the opposite end portions of the supplementary frame plate 13 are two bearing members 35 and 36 which support a rock shaft 37 extending over the conveyor belt 19 in an oblique direction and parallel to the separator bar 29. Rocker arms 38 and 39 are secured to the shaft 37, as by set screws 40, and extend forwardly adjacent the side edges of the conveyor belt. The rocker arm 38 carries an electric motor 41, which drives a pulley 42, and terminates at its forward end in a handle 43 by means of which the shaft 37 may be rocked. The rearward end of the arm 38 carries a counterweight 44 which slightly overbalances the weight of the motor, whereby to normally hold the forward ends of the arms 38 and 39 up and away from the conveyor, for a purpose to be hereinafter explained. The forward end of the arm 39 forms a journal for a shaft 45 carrying an idler pulley 46 of substantially the same size as the pulley 42, and running over these two pulleys is an endless band cutter 47 having its lower cutting edge provided with cuts or serrations 48.

When the parts are in cutting position, as shown in Figs. 1 and 3, the axes of the pulleys 42 and 46 are inclined slightly, so that only the forward stretch 49 of the endless band cutter comes in contact with the fabric sheet A, and the cutting edge of this operative portion of the cutter is then in line with the groove 31 of the separator bar. Thus it will be seen that as the motor 41 is operated, the forward stretch 49 of the cutting band will move continuously in a straight line across the fabric, and by depressing the handle 43, the fabric may be quickly cut. In order to hold the fabric against lateral displacement during the cutting operation, suitable presser members are provided, here shown as in the nature of rollers 50 adjustably mounted on arms 51 secured to the shaft 37. These rollers are adapted to engage the fabric adjacent to the separator bar 29 at the rear of the cutting line, and they are raised and lowered with the cutter so as not to interfere with the feeding of the fabric.

In using the improved machine, the supplementary frame 13 is first adjusted to the proper angle desired, after which the sheet material A is fed forwardly on the conveyor by manual rotation of the crank 26, the endless band cutter being then in its raised position under the influence of the counterweight 44. As soon as the material has been advanced a sufficient amount beyond the cutting line, the operator stops turning the crank 26 and depresses the handle 43. This causes the front stretch 49 of the cutting band to engage the fabric sheet over the separator bar 29, and operation of the motor 41 results in severing a bias-cut strip from the sheet A. When the cut has been completed, the operator releases the handle 43, raising the cutting blade to its inactive position, and leaving the material free to be fed forwardly again, by rotation of the crank 26, to the next cutting position as determined by the width of the next strip to be cut. These operations can be repeated as often and as rapidly as desired, and because of the fact that the cutter operates across the full width of the fabric, the cutting can be effected very rapidly.

To enable the operator to measure the amount of material fed by the movement of the conveyor, and to gauge accurately the width of the strips to be cut, there is located at the delivery side of the conveyor a gauge bar or ruler 53 disposed perpendicular to the line of the cut, and having one end adjustably secured to the main frame side rail 11, as at 54, for endwise and swinging movement, and its other end 55 preferably terminating at the line of cut, altho not necessarily so. The gauge bar overlies the conveyor 19 as best shown in Fig. 1, so that the cut strips are carried below it, and intermediate its ends the bar has an adjustable sight member or pointer 56, by which the amount of intermittent feed movement of the conveyor can be governed. Thus after a cut has been made as previously described, the conveyor is operated until the line of the last cut registers with the sight member or pointer 56, at which time the conveyor is stopped and the next cut made. With this arrangement, the product of the machine is uniform in width and as a result, waste of material is reduced to a minimum.

The improved bias cutting machine is of extremely simple construction, capable of being produced at low cost, and will be efficient in operation. In view of the low cost of operation of the machine, its production can be regulated to suit the requirements of a group of tire builders, making it possible to supply them with fresh bias cut strips which may be used at once for the building of tires, thus improving the quality of the tires and eliminating the extra expense incident to handling and storing the strips in books or liner rolls. The machine can also be used to operate on different widths or thicknesses of fabric without making bothersome adjustments, and can be easily and quickly adjusted to vary the angle of the bias cut.

The invention is of course susceptible of numerous modifications in the details of construction and arrangement of parts, and the right is herein reserved to make such changes as fall within the scope of the appended claims without departing from the spirit of the invention.

Having thus described our invention, what we claim is as follows:

1. A bias cutting machine comprising, in combination, an endless belt conveyor for advancing fabric from a source of supply to a cutting position, a transversely extending frame disposed obliquely with reference to the path of movement of the conveyor, a power-driven endless band cutter extending obliquely over the conveyor and rockably supported by the frame, a plate or bar associated with said frame and adapted to support the fabric at the cutting line, presser members adapted to engage the fabric to maintain the same against displacement, means moving the endless band cutter into and out of cutting position independently of the action of said conveyor, and means for independently and intermittently operating the conveyor.

2. A bias cutting machine comprising a fixed main frame, a substantially horizontal endless belt conveyor supported by said main frame for feeding fabric step-by-step in a straight run without tension, a power-driven cutter supported upon said frame and being in the nature of an endless band having a serrated edge extending obliquely over the conveyor, a fabric supporting bar associated with the frame and disposed below the operative portion of the endless band cutter, said bar having a longitudinal groove defining the cutting line, means for moving the cutter toward and from the supporting bar independently of the action of the conveyor, presser members adapted to engage the fabric to hold the same against lateral displacement during the cutting operation, and means for independently advancing the conveyor any desired amount when the cutter is in its inactive position.

3. A bias cutting machine including in combination, a manually operable conveyor for advancing fabric from a source of supply to cutting position at the will of the operator and in any desired quantity, a transversely extending frame disposed over the conveyor and adjustable to different angles with reference to the direction of movement of the conveyor, a longitudinally movable cutting blade supported upon said frame and operable to sever the fabric into successive bias-cut strips, said cutter being in the nature of an endless band having a cutting edge and running over pulleys which rotate in a plane inclined with reference to that of the fabric, means for moving the cutting blade into cutting position independently of the action of the conveyor and means for moving the cutting blade out of cutting position when the cutting blade is released from such cutting position.

4. A bias cutting machine comprising, in combination, a fixed main frame, a substantially horizontal endless belt conveyor supported by said main frame for feeding fabric step by step in a straight run without tension, bearing brackets mounted on the fixed frame at opposite sides of the conveyor, a rock shaft journalled in said bearing brackets and extending obliquely over the conveyor, rocker arms secured to said shaft and adjacent the ends thereof, said rocker arms having pulleys journaled in their free ends, said pulleys rotating in a plane inclined to that of the conveyor, a power driven endless band cutter running over said pulleys, means associated with one of the rocker arms for rocking the shafts, pulleys, and cutter whereby to move one stretch of the cutter into and out of engagement with the fabric on the conveyor, a longitudinally grooved bar disposed below said operative stretch of the cutter to support the fabric in the cutting operation, presser members spaced from each other and secured to the rock shaft and adapted to engage the fabric adjacent one side of the supporting bar whereby to hold the fabric against lateral displacement during the cutting operation, and means for manually advancing the conveyor any desired amount when the cutter is in its inactive position, whereby to cut successive bias strips of any desired width with accuracy.

5. A bias cutting machine comprising, in combination, a fixed main frame, a substantially horizontal endless belt conveyor supported by said main frame for feeding fabric step by step in a straight run without tension, bearing brackets mounted on the fixed frame at opposite sides of the conveyor, a rock shaft journalled in said bearing brackets and extending obliquely over the conveyor, rocker arms secured to said shaft and adjacent the ends thereof, said rocker arms having pulleys journalled in their free ends, said pulleys rotating in a plane inclined to that of the conveyor, a power driven endless band cutter running over said pulleys, means associated with one of the rocker arms for rocking the shaft, pulleys, and cutter whereby to move one stretch of the cutter into and out of engagement with the fabric on the conveyor independently of the action of the conveyor, a longitudinally grooved bar disposed below said operative stretch of the cutter to support the fabric in the cutting operation, and presser members spaced from each other and secured to the rock shaft and adapted to engage the fabric adjacent one side of the supporting bar whereby to hold the fabric against lateral displacement during the cutting operation.

In testimony whereof, this specification has been duly signed by:

HARRY S. ALEXANDER.
FRED B. PFEIFFER.
JOHN W. WHITE.